United States Patent [19]
Periyathamby et al.

[11] Patent Number: 5,945,756
[45] Date of Patent: Aug. 31, 1999

[54] ULTRA QUIET ELECTRIC MOTOR FOR AUTOMOTIVE APPLICATIONS

[75] Inventors: Haran K. Periyathamby; Marek Horski; Peter A. Kershaw, all of London, Canada

[73] Assignee: Siemens Canada Limited, Mississauga, Canada

[21] Appl. No.: 08/946,481

[22] Filed: Oct. 7, 1997

[51] Int. Cl.[6] .......................... H02K 5/24; H02K 5/167; F16C 2/03
[52] U.S. Cl. .................... 310/89; 310/43; 310/51; 310/90; 310/91; 384/192; 384/195; 384/202; 384/210
[58] Field of Search ................... 310/43, 51, 90, 310/91, 89, 239, 242, 245, 248; 384/192, 195, 202, 203, 210, 204, 217, 220

[56] References Cited

U.S. PATENT DOCUMENTS

| | | | |
|---|---|---|---|
| 3,330,515 | 7/1967 | Janssen et al. | 310/90 |
| 3,337,165 | 8/1967 | Kondo | 310/90 |
| 3,459,977 | 8/1969 | Janssen | 310/51 |
| 3,463,950 | 8/1969 | Schadlich | 310/51 |
| 4,112,321 | 9/1978 | Wan | 310/242 |
| 4,186,319 | 1/1980 | Dochterman | 310/89 |
| 4,368,931 | 1/1983 | Casler et al. | 384/192 |
| 4,631,433 | 12/1986 | Stokes | 310/89 |
| 4,665,332 | 5/1987 | Meir | 310/77 |
| 4,801,833 | 1/1989 | Dye | 310/239 |
| 4,823,032 | 4/1989 | Ward et al. | 310/43 |
| 4,845,396 | 7/1989 | Huber | 310/239 |
| 4,931,681 | 6/1990 | Spaggiari | 310/154 |
| 5,049,770 | 9/1991 | Gaeth et al. | 310/89 |
| 5,113,104 | 5/1992 | Blaettner et al. | 310/90 |
| 5,126,607 | 6/1992 | Merriman, Jr. | 310/51 |
| 5,204,567 | 4/1993 | Kinoshita et al. | 310/90 |
| 5,235,227 | 8/1993 | Fazekas | 310/51 |
| 5,237,231 | 8/1993 | Blaettner et al. | 310/239 |
| 5,358,341 | 10/1994 | Blaettner et al. | 384/204 |
| 5,373,208 | 12/1994 | Ichimura et al. | 310/154 |
| 5,414,317 | 5/1995 | Reid et al. | 310/239 |
| 5,444,314 | 8/1995 | Okada | 310/40 MM |
| 5,453,646 | 9/1995 | Gleixner et al. | 310/51 |
| 5,494,356 | 2/1996 | Strobl | 384/204 |
| 5,497,039 | 3/1996 | Blaettner et al. | 310/51 |
| 5,497,404 | 3/1996 | Sato | 310/67 R |
| 5,530,304 | 6/1996 | Mirumachi et al. | 310/51 |

FOREIGN PATENT DOCUMENTS 215229 7/1985 United Kingdom ..................... 310/90

*Primary Examiner*—Nestor Ramirez
*Assistant Examiner*—Tran N Nguyen

[57] ABSTRACT

A high speed electric motor for automotive applications that is designed to effectively minimize vibration of its component parts and thus suppress noise generated during its operation. The motor incorporates acoustic engineering principles including surface vibration control, acoustic radiation efficiency, active intensity field control and noise control using acoustic materials to reduce overall vibration of the motor components and the motor noise sensed by the passenger of the vehicle.

20 Claims, 9 Drawing Sheets

| b/a | 0.25 | 0.5 | 1 | 2 | 3 | 4 |
|---|---|---|---|---|---|---|
| θ | 73 | 60 | 38 | 19 | 14 | 13 |

ULTRA QUIET ELECTRIC MOTOR FOR AUTOMOTIVE APPLICATIONS

BACKGROUND OF THE INVENTION

1. Field of the Invention

The present invention relates generally to electric motors for automotive applications, and, more particularly, to an electric motor incorporating vibration reduction and acoustic engineering principles to effectively minimize component vibration and noise generated during operation.

2. Description of the Prior Art

Fractional HP direct current electric motors are commonly used in the automotive industry to power heating, ventilation and/or air conditioning systems, radiator engine cooling fans, etc. These motors generally include an outer frame or housing and an armature mounted for rotational movement within the housing. An electric current is carried through electromagnetic windings of the armature to create an electromagnetic field which cooperates with permanently fixed magnets disposed within the housing to cause rotation of the armature and consequent powering of the system.

Due to various factors such as motor or armature imbalance, unequal magnetic forces and bearing defects, operation of the motor may cause excessive surface vibration of the motor components. This vibration results in the generation of undesired airborne noise and structural sound which often propagates to the vehicle interior, thereby having a deleterious affect on passenger comfort.

Automotive manufacturers and suppliers have undertaken efforts to minimize acoustic noise radiation of electric motors. One conventional approach incorporates resilient washers which are positioned about the armature shaft proximate the bearings to resist movement of the armature relative to the frame, thus, attempting to minimize noise created by axial movement of the armature. Other noise suppression approaches include the use of noise absorption materials, barriers and circuits.

None of the foregoing efforts, however, discloses a complete solution for effective suppression of vibration and noise generated by an electric motor.

SUMMARY OF THE INVENTION

Accordingly, the present invention is directed to a high speed electric motor for automotive applications that is designed to effectively minimize vibration of its component parts and thus suppress noise generated during its operation.

In one preferred embodiment, the electric motor for automotive applications that exhibits minimal acoustic noise radiation, includes a housing having front and rear ends and an internal chamber, an armature shaft, an end cap mounted adjacent the rear end of the housing to substantially enclose the internal chamber, a brush card assembly proximate the end cap and at least one bearing assembly. The end cap has a stamped pattern with at least one raised portion configured to minimize vibration energy transfer. The bearing assembly includes a bearing member that supports an end portion of the armature shaft and a bearing housing having an internal bore defining a receiving wall portion to accommodate at least a portion of the bearing member. The bearing housing is dimensioned such that the receiving wall portion is in contacting engagement with an outer surface of the bearing member to facilitate absorption of vibration energy from the bearing. Preferably, the bearing housing comprises a vibration energy absorbing material.

The bearing housing of the bearing assembly may include a base defining a central axis, and a plurality of mounting projections extending from the base. The mounting projections are configured to surround at least a portion of the bearing member to facilitate retention of the bearing member within the bearing housing. The mounting projections are dimensioned such that a gap is defined between the portion of the bearing member and the mounting projections to permit adjusting movement of the bearing member within the bearing housing.

The end cap includes a main portion and a peripheral lip portion extending in an axial direction from the main portion. The brush card assembly includes a brush card mount and a brush card supported by the brush card mount. The brush card mount is at least partially disposed within the peripheral lip portion of the end cap and in contacting engagement therewith. The brush card mount includes a vibration energy absorbing material to thereby absorb vibration energy from the end cap. The brush card mount may include an outer portion where the outer portion is disposed between the peripheral lip portion of the end cap and the rear end of the housing to minimize vibration energy transfer therebetween.

The electric motor may further include an energy absorbing material at least partially surrounding the one bearing assembly to dampen residual acoustic energy and also a noise absorption member disposed adjacent the one bearing assembly to absorb noise energy emanating from the one bearing. An anti-vibration washer may be mounted to the armature shaft adjacent the one bearing assembly configured to absorb vibration energy transferred along the armature shaft.

At least one fastener extends through corresponding apertures of the end cap, the brush card mount and the housing, to operatively connect the end cap to the housing. The one fastener includes a substantially rigid spacer sleeve coaxially mounted thereabout and disposed between the end cap and the rear end of the housing to maintain a predetermined distance therebetween.

The housing of the electric motor is preferably dimensioned to minimize noise energy. The housing defines a main body section having a length and an internal cross-sectional dimension. The length ranges from about 0.50 to about 0.80 times the distance of the internal dimension.

A motor mounting flange connected to the housing is adapted to mount the housing to a supporting portion of a vehicle frame. The mounting flange preferably includes a stamped pattern having a plurality of peripherally positioned depressed portions and configured to absorb vibration energy.

In another preferred embodiment, the electric motor for automotive applications includes a housing having a closed housing end portion and an open housing end portion and an internal chamber, an armature disposed within the internal chamber and having an armature shaft and an armature core, an end cap mounted to the open housing end portion and having a main portion and a peripheral lip portion extending in a general axial direction from the main portion, first and second bearing assemblies for supporting the armature shaft for rotational movement, a brush card assembly having a brush card mount and a brush card supported by the brush card mount, a noise absorbing member disposed between each bearing assembly and the armature core of the armature and being adapted to absorb noise from the respective bearing assembly to substantially acoustically isolate the respective housing end portions, and an anti-vibration washer mounted to the armature shaft adjacent each bearing assembly and configured to absorb energy transferred along the armature shaft. The main portion of the end cap has a stamped pattern with at least one raised portion configured to minimize vibration energy transfer. The first bearing assembly is disposed adjacent the closed housing end portion and the second bearing assembly is disposed adjacent the end cap. Each bearing assembly includes a bearing member and a bearing housing having an internal bore that accommodates at least a portion of the bearing member. The bearing housing comprises a vibration energy absorbing material, and is dimensioned such that portions of the bearing housing defining the internal bore are in contacting engagement with an outer surface of the bearing member to facilitate absorption of vibration energy from the sleeve member bearing. The brush card mount is at least partially disposed within the peripheral lip portion of the end cap and in contacting engagement therewith. The brush card mount comprises a vibration energy absorbing material to thereby absorb vibration energy carried by the end cap.

In another alternate embodiment, the electric motor includes a housing having front and rear ends and defining an internal chamber, an armature disposed within the internal chamber of the housing and having an armature shaft, an end cap mounted to the rear end of the housing to substantially enclose the internal chamber of the housing, a brush card assembly proximate the end cap and having a brush card mount and a brush card supported by the brush card mount and at least one sleeve bearing assembly supporting the armature shaft for rotational movement within the housing. The armature, end cap, brush card assembly and the one sleeve bearing are, preferably, dimensioned such that during operation a decibel rating of less than about 37 dba. is generated.

BRIEF DESCRIPTION OF THE DRAWINGS

Preferred embodiments of the invention are described in greater detail hereinbelow with reference to the drawings wherein.

DETAILED DESCRIPTION OF THE PREFERRED EMBODIMENTS

General

In general, the motor of the present invention advantageously incorporates acoustic engineering principles to dramatically minimize vibration and noise levels emitted by the motor, thus decreasing the noise level in the interior of an automotive vehicle. The motor may be adapted for a number of different automotive applications including heat, ventilation, air conditioning systems, radiator engine cooling fans, etc.

Following a general description of the present invention, the description will be divided into separate sections to describe the structure and the acoustic engineering principles incorporated therein to minimize vibration and noise levels.

Figure 1:
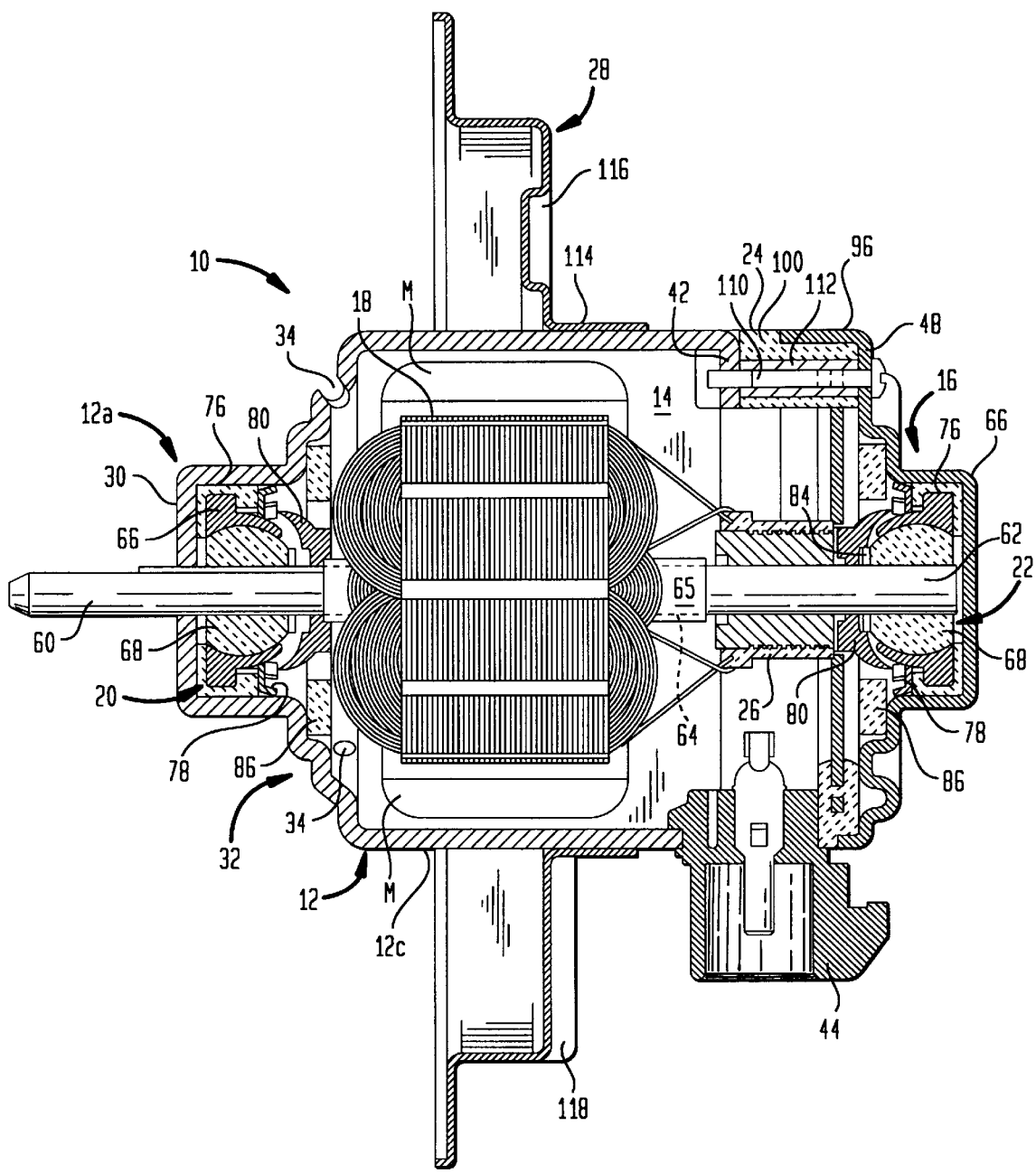
FIG. 1 is a side cross-sectional view of the ultra quiet electric motor constructed in accordance with the principles of the present disclosure.
Figure 3:
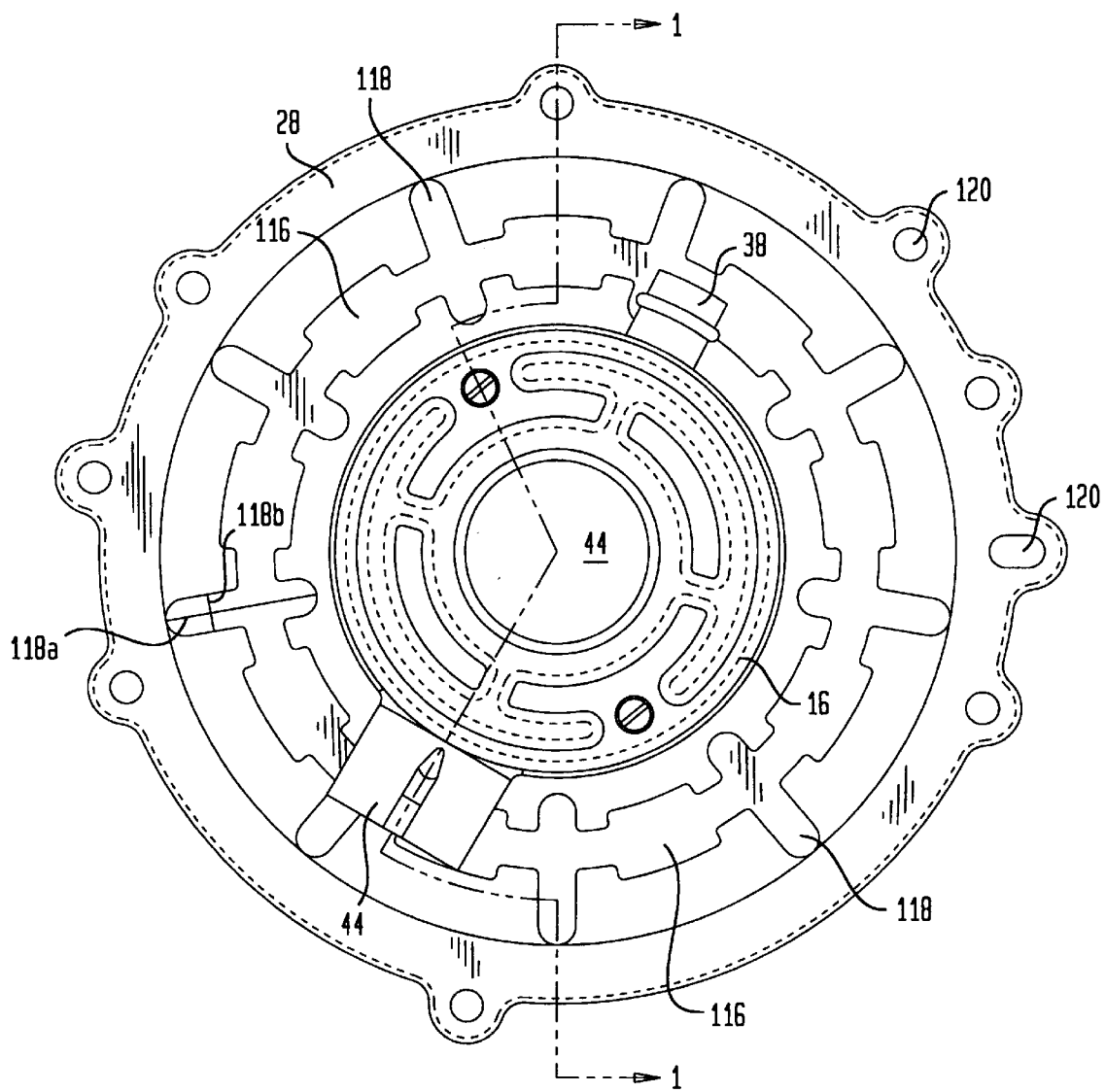
FIG. 3 is an axial plan view of the rear end of the motor illustrating the end cap and the motor mounting flange.
Figure 2:
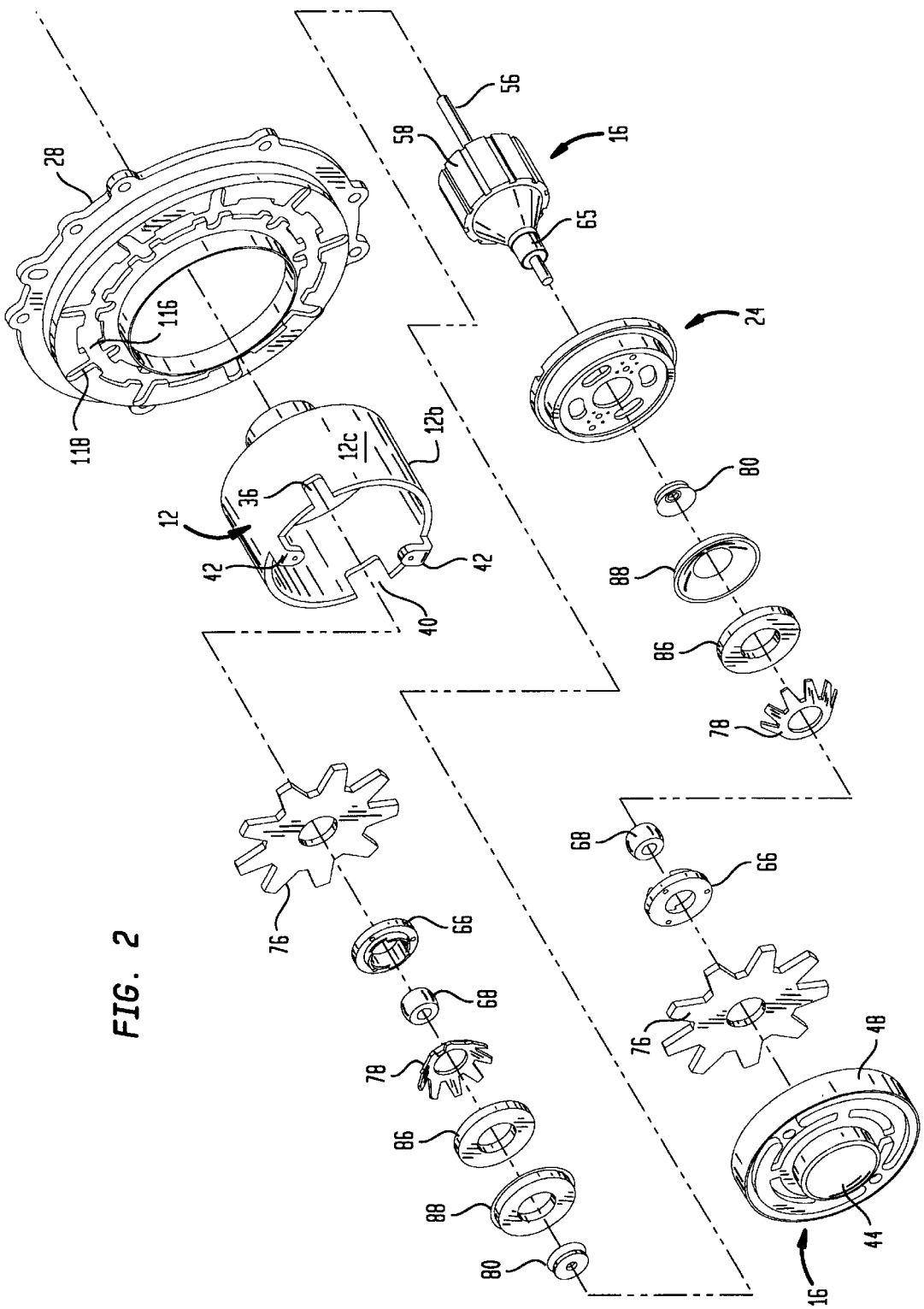
FIG. 2 is a perspective view with parts separated of the electric motor of FIG. 1.

Referring now in detail to the drawings wherein like numerals identify similar or like elements through the several views, FIGS. 1–3 illustrate the ultra quiet electric motor in accordance with the principles of the present invention. FIGS. 1–2 are cross-sectional and exploded views respectively of the motor and FIG. 3 is a rear axial plan view of the motor. The cross-sectional view of FIG. 1 is taken along the lines 1—1 of FIG. 3.

Motor 10 includes housing or casing 12 defining an internal cavity 14, end cap 16 mounted to the rear end of the housing 12 to enclose the cavity 14 and armature assembly 18 supported for rotational movement within the housing 12 by front and rear bearing assemblies 20, 22. Motor 10 further includes brush card assembly 24 mounted adjacent end cap 16 and commutator 26 which cooperates with the brush card assembly 24 to supply electric current to armature assembly 18. A mounting flange 28 is connected to housing 14 for operatively connecting or mounting motor 10 to a supporting portion of the automotive vehicle.

Housing

Figure 1A:
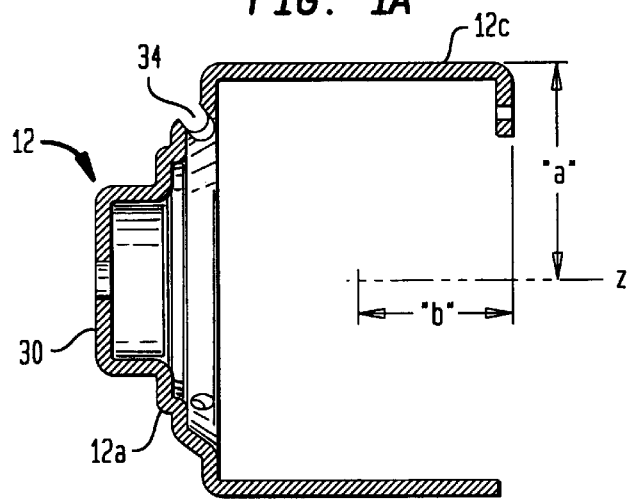
FIG. 1A is a side cross-sectional view of the housing of the electric motor of FIG. 1.

With reference to FIGS. 1 and 1A, housing 12 has housing front end 12a which defines a closed central hub portion 30 and a stepped region 32 characterized by a plurality of steps extending from the hub portion 30 to the main portion of the housing 12. Central hub portion 30 is structured to facilitate mounting of bearing assembly 20 as discussed in detail below. Stepped region 32 increases the effective length or area of housing front end 12a and consequently enhances absorption of vibration energy emanating from front bearing assembly 20.

Housing 12 further includes a plurality of ventilation apertures 34 extending through housing front end 12a and first cut-out portion 36 (FIG. 2) defined in housing rear end 12b. First cut-out portion 36 accommodates vent tube 38 (FIG. 3) which is positioned within the first cut-out portion 36 and retained therein by end cap 16 and brush card assembly 24. Ventilation apertures 34 and vent tube 38 provide sufficient circulation of air over armature assembly 18 to cool the assembly components during operation. Housing 12 also defines second cut-out portion 40 and diametrically opposed radially depending mounting legs 42. Second cut-out portion 40 receives electrical connector 44. Mounting legs 42 facilitate mounting of end cap 16 and brush card assembly 24 to housing as discussed below.

Housing 12 is advantageously dimensioned to be in-line with passive noise cancellation principles to increase the near field reactive acoustic field around the motor. In general, the phase angle between acoustic pressure and particle velocity fields determines the contents of active and reactive intensity of the nearfield acoustic propagation. The greater the strength of the reactive field the greater the control on the noise propagation as created by the motor components to the farfield. The phase angle is related at least in part to the housing dimensions and, if appropriately selected, the strength of the reactive intensity field may be maximized causing the destruction of the active intensity field generated by the motor components.

In this regard, since housing 12 is basically of cylindrical form, the surface vibration generated on housing 12 may be regarded as a series of rotating sinusoidal waves of displacement on the cylindrical surface of the machine. The phase difference between sound pressure and particle velocity is represented by the following formula:

$$\theta_{p-v} = \frac{\pi}{2} + \frac{\tan^{-1}(Q_{PM})}{Q_{PR}} - \frac{\tan^{-1}(Q_{VM})}{Q_{VR}} \text{ where} \quad (1)$$

$$Q_{PM} = \int_{-k+\varepsilon}^{k-\varepsilon} \frac{2\sin(bh)}{bh\sqrt{k^2-h^2}} \cdot \frac{(Q_B Q_C - Q_A Q_D)}{Q_C^2 + Q_D^2} dh$$

$$Q_{PR} = \int_{-k+\varepsilon}^{k-\varepsilon} \frac{2\sin(bh)}{bh\sqrt{k^2-h^2}} \cdot \frac{(Q_A Q_C - Q_B Q_D)}{Q_C^2 + Q_D^2} dh - 4\int_{o+\varepsilon}^{\infty} \cos\{\sqrt{(k^2+x^2/a)}z\}$$

$$\sin\frac{(b/a\sqrt{(a^2k^2+x^2)}}{b/a(a^2k^2+x^2)} \cdot \frac{K_m(rx/a)}{K_{m-1}(x)+K_{m+1}(x)} dx$$

$$Q_{VM} = \int_{-k+\varepsilon}^{k-\varepsilon} \frac{2\sin(bh)}{bh\sqrt{k^2-h^2}} \cdot \frac{(\varepsilon_B Q_C - \varepsilon_A Q_d)}{Q_C^2 + Q_D^2} dh$$

$$Q_{VR} = \int_{-k+\varepsilon}^{k-\varepsilon} \frac{2\sin(bh)}{bh\sqrt{k^2-h^2}} \cdot \frac{(\varepsilon_A Q_C - \varepsilon_B Q_d)}{Q_C^2 + Q_D^2} dh -$$

$$4\int_{o+\varepsilon}^{\infty} 2x/a\cos\{\sqrt{(k^2+x^2a^2)}z\}\sin$$

$$\frac{(b/a\sqrt{(a^2k^2+x^2)}}{b/a(a^2k^2+x^2)} \cdot \frac{K_{m-1}(rx/a)+K_{m+}(rx/a)}{K_{m-1}(x)+K_{m+1}(x)} dx$$

$$Q_A = \cos(hz)J_m\{r\sqrt{(k^2-h^2)}\} - \sin(hz)Y_m\{r\sqrt{(k^2-h^2)}\}$$

$$Q_A = \cos(hz)Y_m\{r\sqrt{(k^2-h^2)}\} + \sin(hz)J_m\{r\sqrt{(k^2-h^2)}\}$$

$$Q_C = J_{m-1}\{a\sqrt{(k^2-h^2)}\} - J_{m+1}\{a\sqrt{(k^2-h^2)}\}$$

$$Q_D = Y_{m-1}\{a\sqrt{(k^2-h^2)}\} - Y_{m+1}\{a\sqrt{(k^2-h^2)}\}$$

$$X = -j\{a\sqrt{k^2-h^2}\}$$

$$\varepsilon_A = \sqrt{(k^2-h^2)}\cos(hz)\left[J_{m-1}\{r\sqrt{(k^2-h^2)}\} - \frac{m}{r\sqrt{(k^2-h^2)}}J_m\{r\sqrt{(k^2-h^2)}\}\right] -$$

$$(k^2-h^2)\sin(hz)\left[J_{m-1}\{r\sqrt{(k^2-h^2)}\} - \frac{m}{r\sqrt{(k^2-h^2)}}J_m\{r\sqrt{(k^2-h^2)}\}\right]$$

-continued $$\varepsilon_B = \sqrt{(k^2-h^2)}\cos(hz)\left[Y_{m-1}\{r\sqrt{k^2-h^2}\} - \frac{m}{r\sqrt{(k^2-h^2)}}Y_m\{r\sqrt{(k^2-h^2)}\}\right] +$$

$$(k^2-h^2)\sin(hz)\left[J_{m-1}\{r\sqrt{(k^2-h^2)}\} - \frac{m}{r\sqrt{(k^2-h^2)}}J_m\{r\sqrt{(k^2-h^2)}\}\right]$$

$K_i$=is a modified Bessel function
$J_i$=is a Bessel function of the first kind
$Y_i$=is the Bessel function of the second kind
k (wave number)=w (angular frequency)/c(speed of sound)
2b=length of housing 12
2a=diameter of housing 12
z=axial distance away from the center of housing 12 of receiver
r=radial location of receiver
f=angular position of receiver
h=a constant which generally approximates the thickness of housing 12

Thus, as shown by the equations, the phase angle $\theta_{p-v}$ varies with the mode number m, the radius of the surface r, wave number k (k=w/c, where w is the angular frequency and c=speed of sound), the axial distance z from the source and is also dependent upon various housing dimensions including the housing length 2a and housing diameter 2b of the machine (see FIG. 1A).

Figure 4:
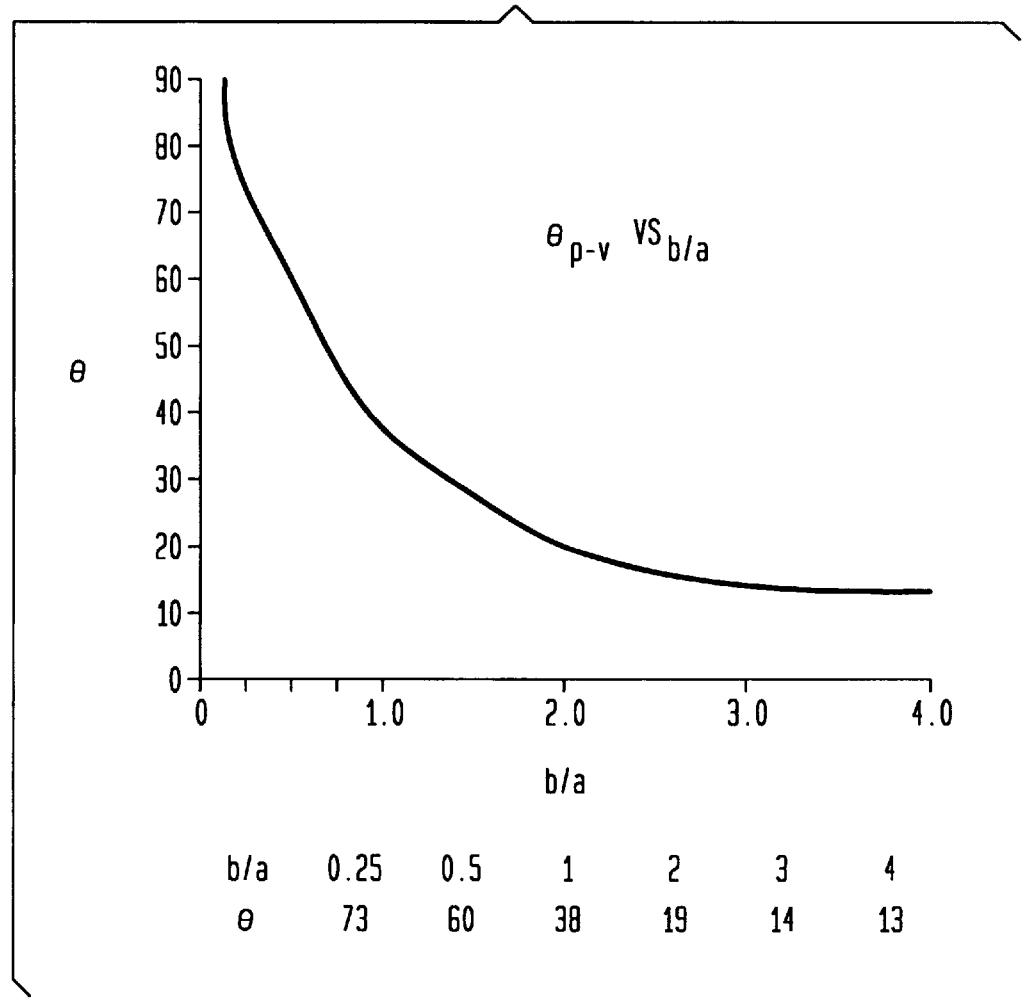
FIG. 4 is a graph illustrating the relationship of phase angle with length/diameter measurements of the housing.

A computer program incorporating the above equations can be generated to calculate the phase angle between pressure and particle velocity in order to optimize the design parameters. FIG. 4 is a graph of the values generated by the program, which depicts how phase angle varies with length/diameter ratio of the housing 12 while other parameters are kept constant. As shown by the graph, it is possible to create a reactive near field around the electric motor by selecting the dimensions of the housing 12.

In the preferred embodiment, the length "2b" of the main cylindrical section 12c (i.e., the cylindrical section with the greatest diameter) of the housing 12 ranges from about 0.50 to about 0.80, more preferably 0.73, the length or distance of the inner diameter "2a" of the main cylindrical section 12c (compared to conventional housings of electric motors which typically have a length to diameter ratio of about 1.25) to produce a phase angle of between about 60° and 70°, more preferably about 65°. The phase angle of about 65° has proven effective in achieving noise cancellation objectives. It is to be appreciated however that any length to diameter ratio of less than about 1.25 is contemplated to be within the scope of the present invention including ratios less than 1.1, 1.0, 0.9 etc.

End Cap

Figure 7:
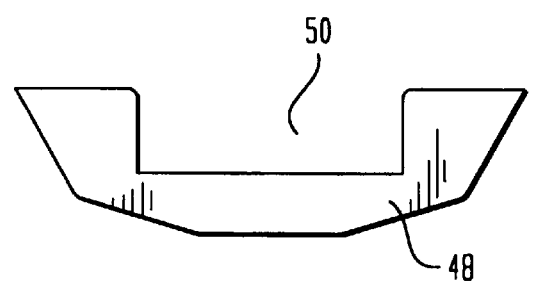
FIG. 7 is a view taken along the lines 7—7 of FIG. 6 illustrating the opening in the end cap for accommodating the electrical connector.
Figure 5:
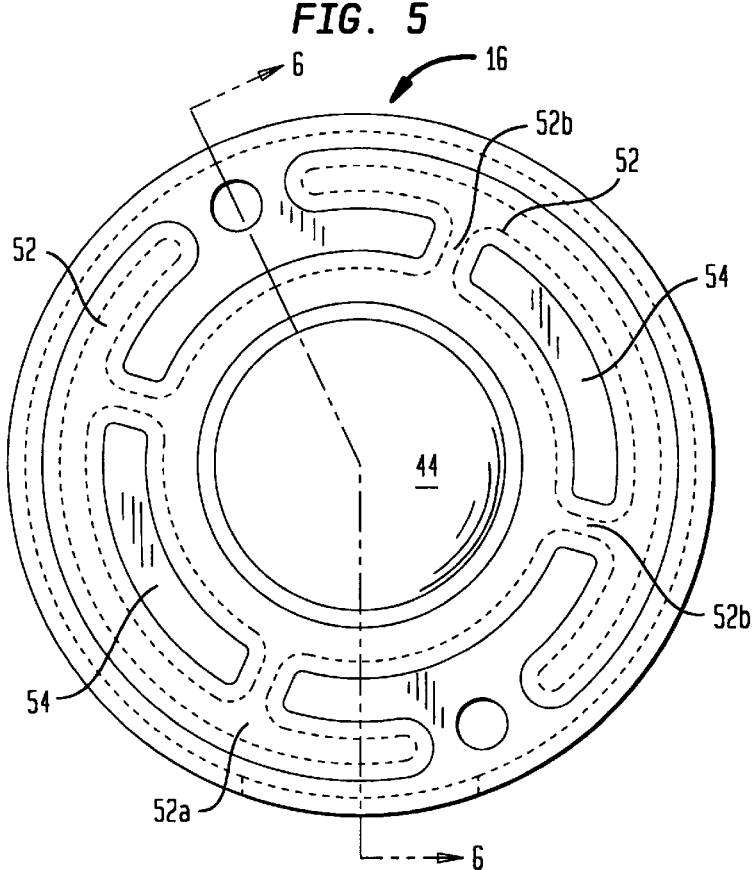
FIG. 5 is an axial plan view of the end cap.
Figure 6:
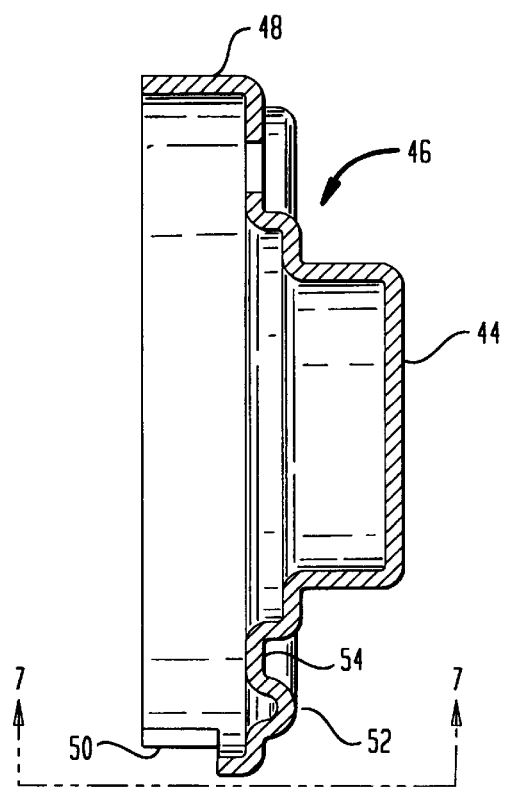
FIG. 6 is a cross-sectional view of the end cap taken along the lines 6—6 of FIG. 5.

Referring now to FIGS. 5–6, in conjunction with FIGS. 1–3, end cap 16 will be discussed in detail. End cap 16 defines central hub portion 44 and a stepped region 46 extending outwardly from the central hub portion. Central hub portion 44 is similar to structure and function to the central hub portion 30 of the front end of housing 12, i.e., it facilitates mounting of rear bearing assembly 22. End cap 16 further defines peripheral lip portion 48 which extends circumferentially about the end cap 16. Peripheral lip portion 48 is advantageously dimensioned to minimize surface vibration of end cap 16 as will be discussed below. Peripheral lip portion 48 includes a cut-out portion 50 (FIGS. 6 and 7) which corresponds to second cut-out portion 40 of housing 12 to accommodate electrical connector 44.

End cap 16 further defines a stamped pattern about central hub portion 44 consisting of a series of alternating elongated arcuate raised portions 52 and depressions 54. The raised portions 52 include peripheral arcuate portions 52a and radial portions 52b. This stamped pattern facilities absorption of vibratory movement created by rear bearing assembly 22 and achieves passive noise cancellation and reduction in surface vibration level. The stamped pattern also helps to shift the natural frequency of the component into a frequency of high end. In particular, the transformation of surface vibration to airborne sound is a function of 1) the amplitude of vibration and 2) the radiation efficiency of the source. The sound pressure level (SPL) at a particular frequency is represented by the following equation:

$$SPL(f) = Lv(f) - 10 \log_{10}(R) + K + 10 \log_{10} \sigma_{rad}$$

where $Lv(f)$=surface vibration level at that frequency; $\sigma_{rad}$= radiation efficiency of the structure;

K is a determined constant based on experience from previous laboratory tests, e.g., $K = 20 \log_{10}[r_o V_o C]$ and is an empirical term in the $P_o$ equation where r=density of medium;

$V_o$=velocity of radiating surface;

c=speed of sound; and $P_o$=pressure of acoustic medium.

The accurate value of K is established by computing and by verification using similar noise sources; and R is the ratio of imaginary surface (sphere) to radiating structure areas (i.e., based on measuring distance).

The surface vibration level (Lv (f)) of a structure due to internal friction depends on the damping capabilities of that structure, i.e., as the frequency of an exciting force (vibration of shaft and bearings) is equal or closer to one of the natural frequencies of a component (end cap 10) the amplitude of vibration is determined by the damping capability of the structure. Damping property is explained by a common parameter called logarithmic decrement δ. For low damping and steady state resonance, the logarithmic decrement δ is obtained from a resonance curve using the following expression: $\delta = \pi \Delta f / freq$ where freq is the resonance frequency and $\Delta f$ is the width of the resonance peak at which the amplitude of vibration is 0.707 times that of resonance.

End cap 16 is advantageously dimensioned to increase its damping characteristics. In particular, the stamped pattern of alternating raised portions 52 and depressions 54 impedes the flow of vibratory energy. Moreover, the stamped pattern helps to split the large vibrating source transferred to end cap 16 into a number of small vibrating sources, thus, in effect, reducing overall surface vibration levels of the end cap. In addition, the stamped pattern works to reduce the overall noise level by making use of the phase variation between the created small vibrating elemental sources. Further, by mutual stiffening with the entire area surface, vibration levels on each small area is also reduced.

In the preferred embodiment, the stamped pattern of the end cap 16 effectively decreases the surface vibration level of the radiating structure. More specifically, arcuate raised portions 52 and depressions 54 effectively decrease the surface vibration level measured six-(6) fold compared to conventional production end caps.

Armature Assembly

Referring again to FIGS. 1 and 2, armature assembly 18 will be discussed in detail. Armature assembly 18 includes armature shaft 56 and armature 58 mounted about the armature shaft 56. Armature shaft 56 consists of shaft end sections 60, 62 and shaft intermediate section 64 (shown in phantom). A tube-like structure 65 surrounds intermediate shaft section 64 and functions as an insulator to insulate armature 58 from the shaft 56. The tube-like structure 65 is preferably formed from two separate tubes positioned over shaft section 64. Preferably, shaft end sections 60, 62 and intermediate section 64 are a homogenous structural member, however, shaft 56 may comprise individual sections 60,62 and 64 joined by conventional means. The overall length of armature shaft 56 is reduced by about 20% relative to conventional units. This reduction facilitates dynamic balancing of the rotor, reduction in mass of rotating part, etc., thereby minimizing vibratory movement of the shaft and noise generation.

Armature 58 may be any conventional armature and consists of an armature core housing a number of stacked, laminations with a set of insulation-coated wire windings wound thereabout. The laminations may be treated with inductive heating if desired. Armature 58 is coaxially mounted about shaft 56. A mounting plate (not shown) may be provided for structural connection of the armature core and windings to intermediate shaft section 64. Armature 58 is in electrical contact with commutator 26 and rotates in response to the magnetic field provided by magnets "m" mounted within housing 12. Armature 58 may be axially centered relative to magnets "m" or may be off-center with respect to the magnets "m" whereby the armature 58 is pre-loaded to one side.

Bearing Assemblies

Figure 8:
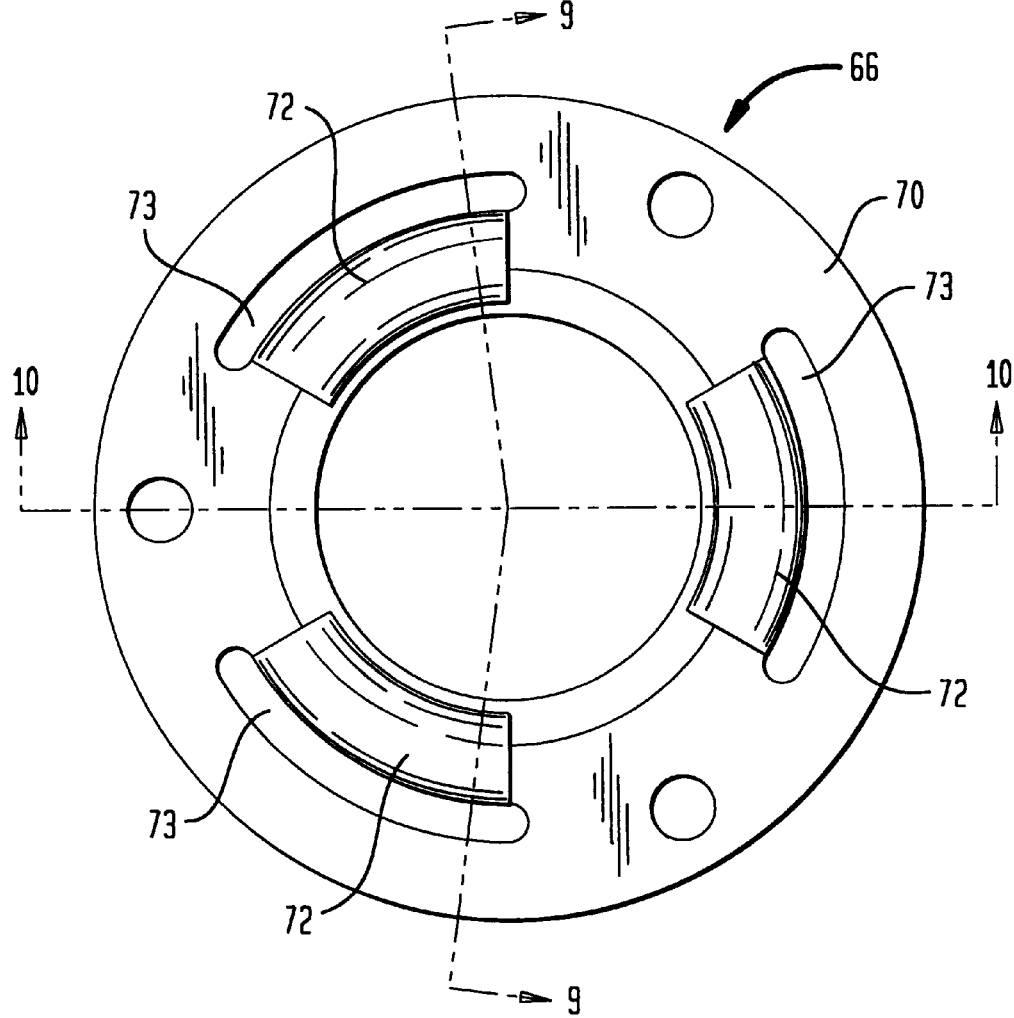
FIG. 8 is an axial plan view of the bearing housing for supporting the sleeve bearing.
Figure 10:
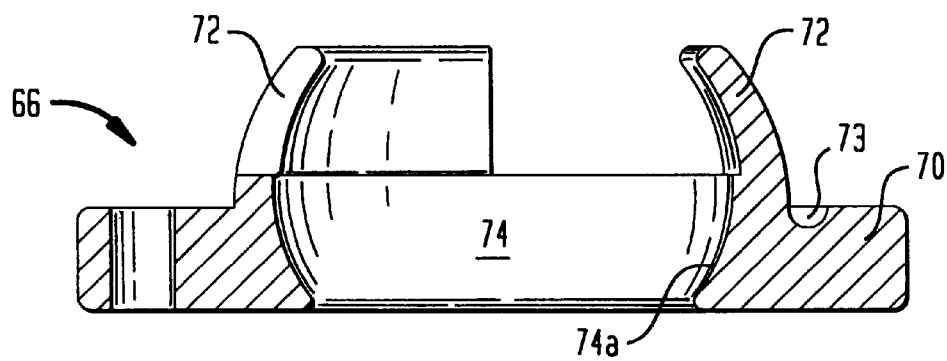
FIGS. 9 and 10 are cross-sectional views of the bearing housing taken along respective lines 9—9 and 10—10 of FIG. 8.
Figure 9:
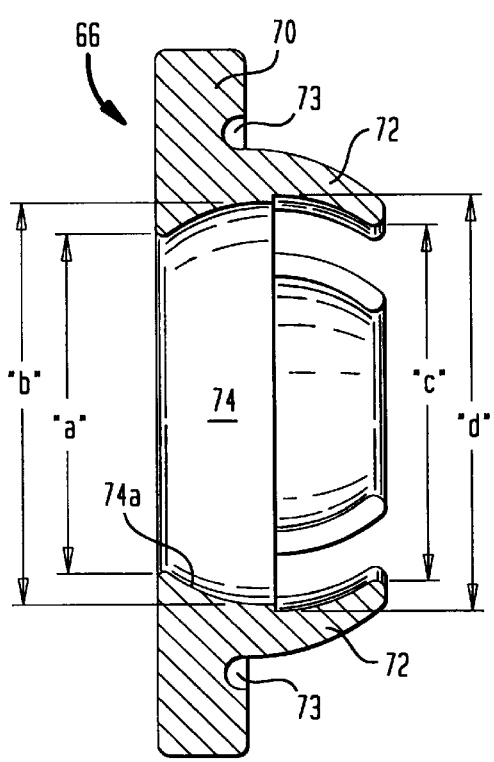

Referring now to FIGS. 8–10, in view of FIGS. 1–2, front and rear bearing assemblies 20, 22 will be discussed. Each bearing assembly 20, 22 is identical with respect to their component parts. Each bearing assembly 20, 22 includes sleeve bearing housing 66 and sleeve bearing 68 supported within the bearing housing. As best depicted in FIGS. 8–10, bearing housing 66 includes annular base 70 and a plurality (e.g., 3) of arcuate mounting projections 72 extending from the base. Annular base 70 has a relatively large cross-sectional dimension and defines internal bore 74 which is configured to generally correspond to the outer dimension of sleeve bearing 68 (both in the radial and axial directions). Consequently, bearing housing 66 receives sleeve bearing 68 in a manner whereby the bearing housing wall portion or receiving wall portion 74a defining internal bore 74 is in contacting engagement with the sleeve bearing portion received therein. Thus, a substantial surface area of bearing sleeve 68 is in contact with bearing housing 66. This feature facilitates transfer of acoustic vibration energy from sleeve bearing 68 to bearing housing 66 as will be discussed in greater detail below. Annular base 70 defines a first dimension or diameter "a" at one end and a second dimension "b" at the other end.

Mounting projections 72 of bearing housing 66 are also dimensioned to follow the configuration of the outer surface of sleeve bearing 68. However, the internal dimension defined by mounting projections 72 is slightly greater than internal bore 74 of annular base 70 and the outer dimension of sleeve bearing 68 as best depicted in FIG. 9 thus providing a slight gap or clearance between the sleeve bearing 68 and the mounting projections 72. More specifically, mounting projections define internal dimension "c" and internal dimension "d" which are greater than corresponding respective dimensions "a", "b" of the annular base 70. This clearance permits adjusting radial movement of sleeve bearing 66 during rotation of armature shaft 56, i.e., it provides self aligning of the bearing system. In addition, a plurality (e.g., three) of arcuate grooves 73 are formed in the outer surface of annular base 70. Grooves 73 serve two functions: 1) the grooves 73 increase the effective length of each mounting projection 72 thus facilitating flexing movement of the mounting projections 72 during assembly and during radial movement of sleeve bearings 66 during operation of the motor; and 2) the grooves 73 may accommodate a retainer to mount the bearing assemblies 20, 22 within their respective housing component.

Bearing housing 66 is preferably fabricated from a plastic material to reduce vibration transmission and to permit absorption of vibration energy transferred through sleeve bearing 66 from armature shaft 56. As indicated above, vibration energy transfer is controlled by the dimensioning of internal bore 74 of bearing housing 66 and made by injection molding. In a preferred embodiment, bearing housing 66 is fabricated from a polymeric material. Bearing housing 66 also serves to prevent direct contact of sleeve bearing 68 with housing front end 12a (or end cap 16). In particular, enlarged base 70 of bearing housing 66 contacts the inner surface of front end 12a (or end cap 16) and distributes the load (of vibration) on housing front end 12a (or the end cap 16) by bearing 68. This provides significant advantages over the prior art where the bearings of prior art motors typically directly contact the housing to create point and/or line loading of the bearings. Such point or line loading undesirably increases vibration of the housing component in direct contact with the bearing. With bearing housing 66 of the present invention, enlarged base 70 advantageously increases the effective area of a surface contact between the bearing assembly 20,22 and the housing front end 12a (or end cap 16) thus distributing the load and minimizing vibration experienced by the housing front end 12a (or end cap 16).

To further minimize vibration transfer from each bearing assembly 20, 22, a bearing housing isolator 76 (FIGS. 1 and 2) may be wrapped about bearing housing 66. Housing isolator 76 is preferably fabricated from an energy (e.g., acoustic) absorbing material such as felt, foam (acoustic) or similar material and is intended to absorb or dampen residual acoustic energy emanating from bearing housing 66.

Each bearing assembly 20, 22 is retained within respective central hub portions 30, 44 of housing front end 12a and end cap 16 by bearing housing retainer 78. Bearing housing retainer 78 is preferably fabricated from a resilient spring material (such as spring steel) and is configured to frictionally engage the interior of the respective central hub portion 30, 44. Bearing housing retainer 78 may be a variety of configurations and may be at least partially accommodated within arcuate grooves 73 formed in the surface of enlarged base 70.

Anti-Vibration Washer

Figure 11:
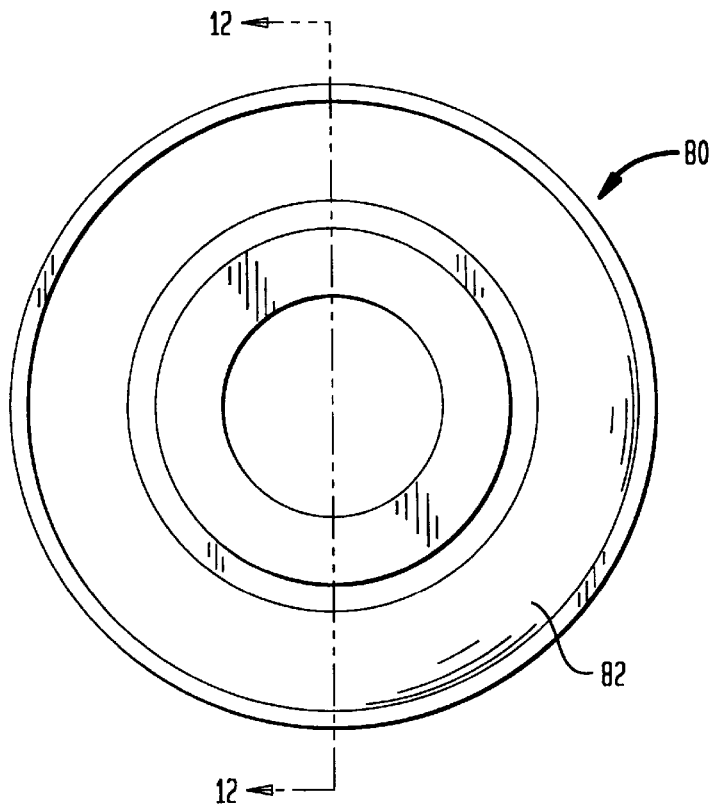
FIG. 11 is an axial plan view of the anti-vibration/dampening (AVD) washer.
Figure 12:
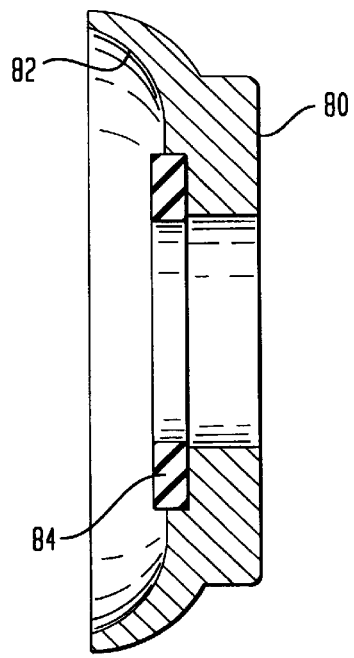
FIG. 12 is a cross-sectional view of the AVD washer taken along the lines 12—12 of FIG. 11.
Figure 13:
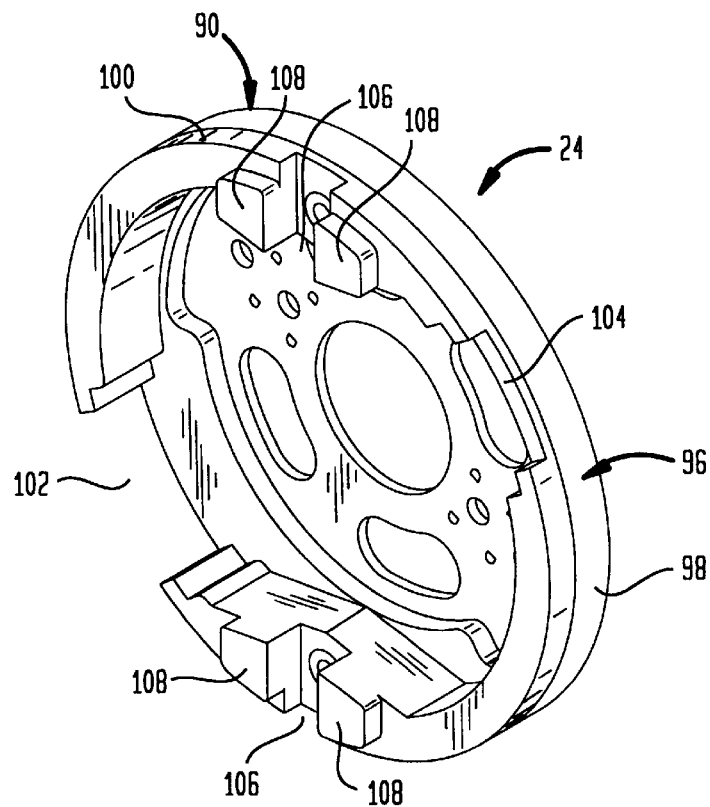
FIG. 13 is a perspective view of the brush card assembly illustrating the brush card mount and the brush card.
Figure 14:
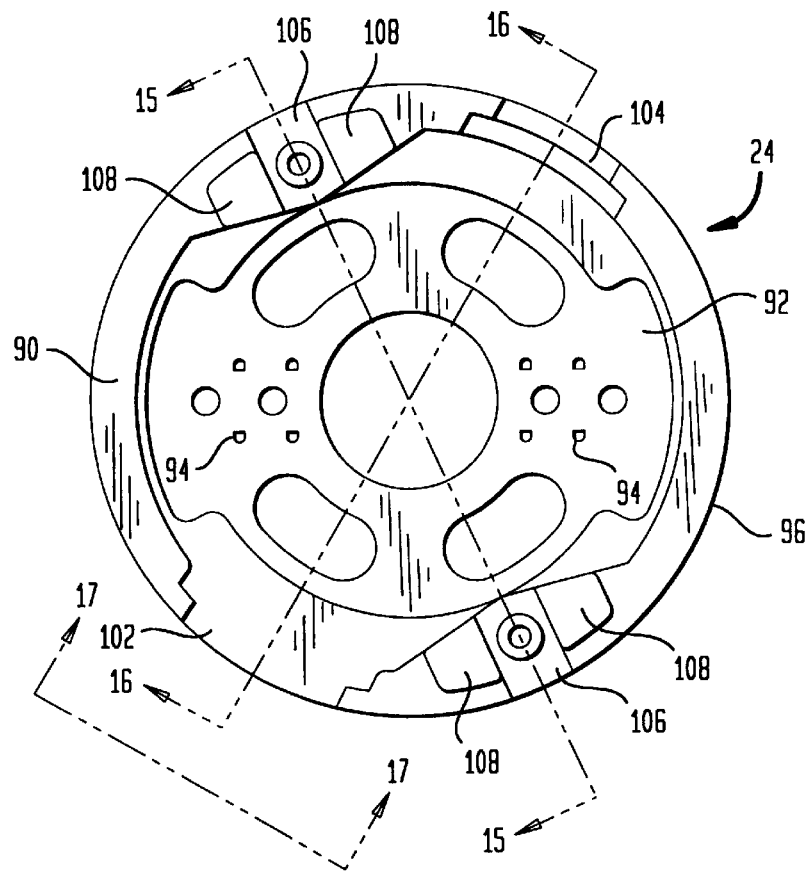
FIG. 14 is an axial plan view of the brush card assembly of FIG. 13.
Figure 15:
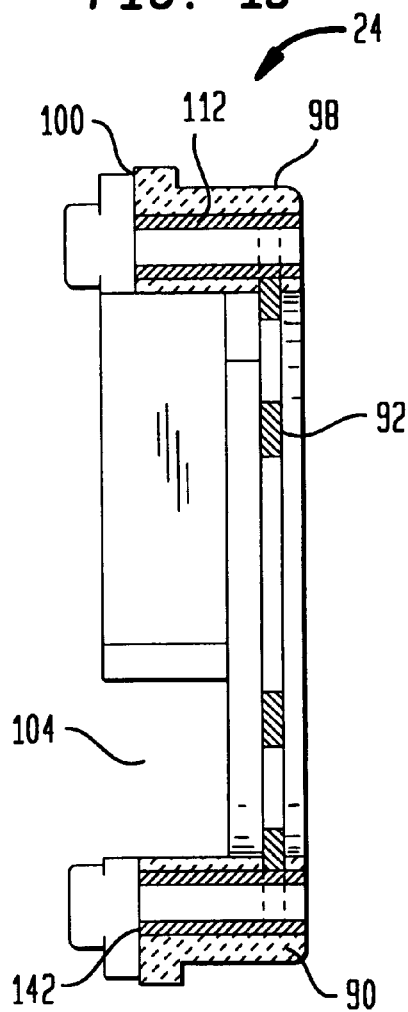
FIGS. 15 and 16 are cross-sectional views of the brush card assembly taken along respective lines 15—15 and 16—16 of FIG. 14.
Figure 16:
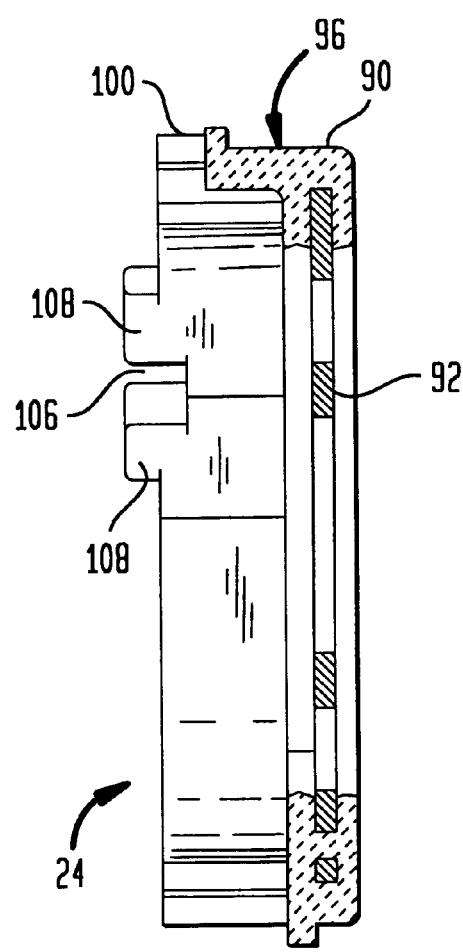
Figure 17:
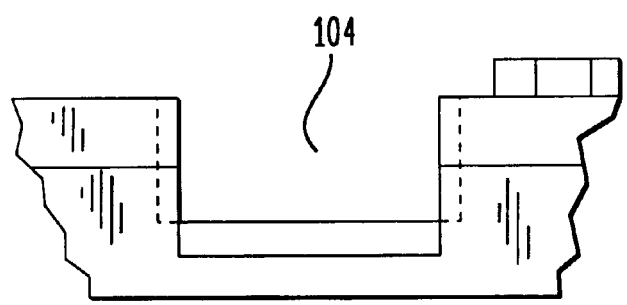
FIG. 17 is a view taken along the lines 17—17 of FIG. 14 illustrating the opening in the brush card mount for reception of the electrical connector.

Referring now to FIGS. 11–12, in conjunction with FIGS. 1–2, an anti-vibration/dampening (AVD) washer 80 is positioned about armature shaft 56 proximate each sleeve bearing 68. AVD washer 80 is preferably press fit into armature shaft 56 and serves dual functions: 1) arcuate surface 82 of AVD washer 80 directs any oil which may leak from sleeve bearings 68 back to the bearing thus increasing bearing life; and 2) the AVD washer dampens axial vibration on armature shaft by acting as an elastic spring. This in turn minimizes any excessive noise created at the sleeve bearings 68 by the shaft movement in the axial direction. At least one resilient washer 84 may be positioned between AVD washer 80 and sleeve bearing 66 to accommodate thrust movement of armature shaft 56 during operation. Suitable material for washer 84 includes elastomeric or plastic materials.

With reference to FIGS. 1–3, a noise absorption member 86 is positioned adjacent AVD washer 80. Noise absorption member 86 is preferably a ring configuration defining an internal aperture for receiving at least a portion of AVD washer 80. Noise absorption member 86 is preferably fabricated from noise absorbing material such as felt, fiber glass, etc. A holder 88 positively fixes noise absorption member 86 within housing front end 12a long end cap 16. Holder 88 is preferably fabricated from a resilient material, e.g., spring steel or a polymeric material, which frictionally engages corresponding inner surfaces of housing front end 12a (or end cap 16) to retain noise absorbing member 86 therewithin. Noise retaining member 86 acoustically isolates front or rear bearing assemblies 20, 22 from the armature section of the motor to absorb residual noise generated by the respective bearing assembly 20, 22.

Molded Brush Card Assembly

Referring now to FIGS. 13–17, in view of FIGS. 1–2, molded brush card assembly 24 will be discussed in detail. Brush card assembly 24 is intended to be an isolator of vibration energy flow between end cap 16, housing 14 and the brush tube assembly. Brush card assembly 24 includes a generally annular shaped brush card mount 90 and a brush card 92 which is supported by the mount. Brush card mount 90 is preferably fabricated from an elastomeric or polymeric material formed through injection molding techniques and capable of absorbing dampening vibration energy flow. Brush plate 92 may be mounted within brush card mount 90 during the molding process to connect the two components. Brush plate 92 includes structure, identified generally by reference numeral 94, (e.g., mounting projections, etc.) to support a plurality of brushes (not shown) to contact commutator 26. Brush plate 92 may be any conventional plate arrangement.

Brush card mount 90 includes a first annular portion 96 defining peripheral surface 98. First annular portion 96 is dimensioned to be positioned within peripheral lip portion 48 of end cap 16 in the assembled condition of the motor depicted in FIG. 1, and is advantageously dimensioned to correspond to the inner dimension of the peripheral lip portion 48 whereby the peripheral lip portion 48 is in contacting engagement with the peripheral surface 98 of the first annular portion 96. Thus, vibration energy carried through end cap 16 and peripheral lip portion 48 is conveyed to first annular portion 96 of brush card mount 90 to be dampened or absorbed by the brush mount. Brush card mount 90 further includes a second annular portion 100 which defines a diameter greater than the diameter of first annular portion 96. In the assembled position of the motor, second annular portion 100 is interposed between end cap 16 and housing rear end 12b to absorb vibratory energy transfer between the two components.

Brush card mount 90 includes first and second cut-outs 102, 104 to respectively receive electrical connector 44 and vent tube assembly 38. Brush card mount 90 further includes diametrically opposed mounting recesses 106 defined between mounting nubs 108 to receive radially depending mounting legs 42 of housing 12. A pair of mounting fasteners 110 (e.g., bolts) are received within correspondingly dimensioned bores of end cap 16, brush card mount 90, brush plate 92 and mounting legs 42 of housing 12 to operatively connect these components. Fasteners 110 may be threaded at their distal ends to threadably engage an internal threaded aperture of housing mounting leg 42. A cylindrical rigid spacer 112 surrounds at least an intermediate portion of each fastener 110. (FIGS. 1 and 15) Spacer 112 maintains a predetermined distance between end cap 16 and housing 12 thereby ensuring that brush plate 92 and the brushes supported thereby are in general perpendicular relation to commutator 26. This facilitates proper orientation of the brushes with commutator 26 to maintain desired continuous electrical contact. Spacer 112 also serves to absorb vibration energy transfer between end cap 16 and housing 12.

Thus, the electric motor of the present invention efficiently reduces acoustic energy transfer and noise level generated during the operation of the electric motor through the incorporation of vibration energy reduction and noise reduction principles. More particularly, the unique configuration of front and rear bearing assemblies 20, 22 minimizes vibration energy transfer to housing front end 12a and end cap 16. Any residual noise which may be generated is absorbed by and isolated within the respective bearing area by noise absorbing members 86. Transfer of vibration energy through the housing front end 12a is reduced by the stepped region of the front end 12a while transfer of energy through the end cap 16 is reduced by the stamped pattern on the face of the end cap 16. Vibration and acoustic energy transfer between the end cap 16, housing 14 and brush plate is minimized by the brush card mold assembly 24.

Mounting Flange

Referring again to FIGS. 1–3, the unique mounting flange 28 for mounting electric motor 10 to the engine frame of the automobile will be discussed. Mounting flange 28 includes an internal lip 114 defining a bore which receives the housing 12 of the electric motor. Internal lip 114 is secured to the outer surface of housing 12 by conventional means including welding, adhesives etc. The peripheral area of mounting flange 28 has a stamped pattern consisting of a series of alternating generally rectangular shaped depressions 116 and arcuate depressions 118 (FIG. 3). The arcuate depressions 118 extend in a radial direction (i.e., arcuate depressions have a radial component 118a greater than a peripheral component 118b). Depressions 116, 118 function to effectively divide the flange into a plurality of sections which in effect separates the large vibrating source transferred to flange 28 into smaller vibrating sources. In addition, the stamping pattern effectively stiffens the flange to also reduce surface vibration levels. Mounting flange 28 also reduces the noise level by making use of the phase variation or difference between the created small vibrating sources. The vibration levels of the structure is thereby decreased, consequently, decreasing the sound pressure level SPL (f) at a particular frequency. In addition, stamped pattern helps to shift the natural frequency of the component into a frequency of high end.

A plurality of mounting apertures 120 extend through the extreme outer surface of the flange 28 for mounting to the vehicle frame.

CONCLUSION

The electric motor of the present invention has proven to be quite effective in minimizing noise generated by the motor. In fact, the electric motor 10 of the present invention has been measured to generate a noise level less than 37 DBA overall when taken at 10 cm distances from the motor surface. Current motor noise specification stands at about 40 DBA thus representing a substantial decrease with the present motor.

While the above description contains many specifics, these specifics should not be construed as limitations on the scope of the invention, but merely as exemplifications of preferred embodiments therefor. Those skilled in the art will envision many other possible variations that are within the scope and spirit of the invention as defined by the claims appended hereto.

We claim:

1. An electric motor for automotive applications that exhibits minimal acoustic noise radiation, which comprises:
    a housing having front and rear ends, and an internal chamber;
    an armature shaft;
    an end cap mounted adjacent the rear end of the housing to substantially enclose the internal chamber of the housing, the end cap comprising:
        a hub extending radially outwardly with respect to a cylindrical section of said housing, and
        a stamped pattern including a series of alternating axial raised portions and depression portions located in an inner peripheral surface of said hub;
    a brush card assembly proximate the end cap, the brush card assembly including a brush card mount and a brush card supported by the brush card mount; and
    at least one bearing assembly including:
        a bearing member that supports an end portion of the armature shaft; and
        a bearing housing having an internal bore defining a receiving wall portion to accommodate at least a portion of the bearing member, the bearing housing being dimensioned such that the receiving wall portion of the bearing housing is in contacting engagement with an outer surface of the bearing member to facilitate absorption of vibration energy from the bearing.

2. The electric motor according to claim 1 wherein the bearing housing comprises a vibration energy absorbing material.

3. The electric motor according to claim 1 wherein the end cap includes a main portion and a peripheral lip portion extending in an axial direction from the main portion, the main portion having the stamped pattern.

4. The electric motor according to claim 1 wherein the bearing housing includes a base defining a central axis, and a plurality of mounting projections extending from the base, the mounting projections configured to surround at least a portion of the bearing member to facilitate retention of the bearing member within the bearing housing.

5. The electric motor according to claim 4 wherein the mounting projections are dimensioned such that a gap is defined between the portion of the bearing member and the mounting projections to permit adjusting movement of the bearing member within the bearing housing.

6. The electric motor according to claim 5 including first and second bearing assemblies.

7. The electric motor according to claim 1 further including energy absorbing material at least partially surrounding the one bearing assembly to absorb residual acoustic energy.

8. The electric motor according to claim 1 further including a noise absorption member disposed adjacent the one bearing assembly to absorb noise energy emanating from the one bearing.

9. The electric motor according to claim 1 further including an anti-vibration washer mounted to the armature shaft adjacent the one bearing assembly configured to absorb vibration energy transferred along the armature shaft.

10. The electric motor according to claim 1 including at least one fastener extending through corresponding apertures of the end cap, the brush card mount and the housing, to operatively connect the end cap to the housing.

11. The electric motor according to claim 10 wherein the at least one fastener includes a substantially rigid spacer sleeve coaxially mounted thereabout, the spacer sleeve disposed between the end cap and the rear end of the housing to maintain a predetermined distance therebetween.

12. The electric motor according to claim 1 further including a motor mounting flange connected to the housing for mounting the housing to a vehicle frame, the mounting flange including a stamped pattern having a plurality of peripherally positioned depressed portions, the stamped pattern configured to absorb vibration energy.

13. The electric motor according to claim 1 wherein the housing is dimensioned to minimize noise energy, the housing defining a main body section and having an internal cross-sectional dimension, the main body section defining a length ranging from about 0.50 to about 0.80 times the distance of the internal dimension.

14. An electric motor for automotive applications that exhibits minimal acoustic noise radiation, which comprises:

a housing having front and rear ends, and an internal chamber;

an armature shaft;

an end cap mounted adjacent the rear end of the housing to substantially enclose the internal chamber of the housing, the end cap having a stamped pattern including at least one raised portion configured to minimize vibration energy transfer, the end cap including a main portion and a peripheral lip portion extending in an axial direction from the main portion, the main portion having the stamped pattern; and a brush card assembly proximate the end cap, the brush card assembly including a brush card mount and a brush card supported by the brush card mount; and at least one bearing assembly including:

a bearing member that supports an end portion of the armature shaft; and a bearing housing having an internal bore defining a receiving wall portion to accommodate at least a portion of the bearing member, the bearing housing being dimensioned such that the receiving wall portion of the bearing housing is in contacting engagement with an outer surface of the bearing member to facilitate absorption of vibration energy from the bearing, wherein the brush card mount is at least partially disposed within the peripheral lip portion of the end cap and in contacting engagement therewith, the brush card mount comprising a vibration energy absorbing material to thereby absorb vibration energy from the end cap.

15. The electric motor according to claim 14 wherein the brush card mount includes an outer portion, the outer portion disposed between the peripheral lip portion of the end cap and the rear end of the housing to minimize vibration energy transfer therebetween.

16. An electric motor for automotive applications and characterized by exhibiting minimal acoustic noise radiation, which comprises:

a housing having a closed housing end portion and an open housing end portion, and an internal chamber;

an armature disposed within the internal chamber and having an armature shaft and an armature core;

an end cap mounted to the open housing end portion, the end cap including a main portion and a peripheral lip portion extending in a general axial direction from the main portion, the main portion having a stamped pattern including at least one raised portion configured to minimize vibration energy transfer;

a brush card assembly including a brush card mount and a brush card supported by the brush card mount, the brush card mount being at least partially disposed within the peripheral lip portion of the end cap and in contacting engagement therewith, the brush card mount comprising a vibration energy absorbing material to thereby absorb vibration energy carried by the end cap;

first and second bearing assemblies for supporting the armature shaft for rotational movement, the first bearing assembly disposed adjacent the closed housing end portion and the second bearing assembly disposed adjacent the end cap, each bearing assembly including a bearing member and a bearing housing having an internal bore that accommodates at least a portion of the bearing member, the bearing housing comprising a vibration energy absorbing material, and being dimensioned such that portions of the bearing housing defining the internal bore are in contacting engagement with an outer surface of the bearing member to facilitate absorption of vibration energy from the sleeve member bearing;

a noise absorbing member disposed between each bearing assembly and the armature core of the armature, the noise absorbing member adapted to absorb noise from the respective bearing assembly to substantially acoustically isolate the respective housing end portion; and an anti-vibration washer mounted to the armature shaft adjacent each bearing assembly, the anti-vibration washer configured to absorb energy transferred along the armature shaft.

17. The electric motor according to claim 16 wherein the brush card mount includes a first annular portion disposed within the peripheral lip portion of the end cap in contacting engagement therewith to absorb vibration energy carried by the end cap, and a second annular portion disposed between the peripheral lip portion of the end cap and the housing to minimize vibration energy transfer therebetween.

18. The electric motor according to claim 17 wherein the bearing housing of each bearing assembly includes:

a base defining a central axis and having an internal bore for accommodating the bearing member and being dimensioned such that portions of the bearing housing defining the internal bore are in contacting engagement with an outer surface of the bearing member to facilitate absorption of vibration energy from the sleeve member bearing; and a plurality of mounting projections extending in a general axial direction from the base, the mounting projections arranged to surround at least a portion of the bearing member to facilitate retention of the bearing member within the internal bore.

19. The electric motor according to claim 18 further including energy absorbing material at least partially surrounding each bearing housing to absorb residual acoustic energy.

20. The electric motor according to claim 16 wherein the housing defines a main body section having an internal cross-sectional dimension, the main body section defining a length ranging from about 0.50 to about 0.80 times the distance of the internal dimension whereby a reactive acoustic field is created about the housing to counteract an active acoustic field generated during operation thereof.

* * * * *